US012752308B2

(12) United States Patent
Chevrette et al.

(10) Patent No.: US 12,752,308 B2
(45) Date of Patent: Oct. 6, 2026

(54) SYSTEM AND METHOD FOR MATERIALS RECOVERY USING A MOBILE MATERIALS RECOVERY FACILITY (MMRF)

(71) Applicant: WM Intellectual Property Holdings, L.L.C., Houston, TX (US)

(72) Inventors: Guillaume Chevrette, Anjou (CA); Vu Nguyen, Houston, TX (US); Jean Beaudoin, Mont-Royal (CA)

(73) Assignee: WM INTELLECTUAL PROPERTY HOLDINGS, L.L.C., Houston, TX (US)

( * ) Notice: Subject to any disclaimer, the term of this patent is extended or adjusted under 35 U.S.C. 154(b) by 0 days.

(21) Appl. No.: 18/927,375

(22) Filed: Oct. 25, 2024

(65) Prior Publication Data

US 2025/0135497 A1 May 1, 2025

Related U.S. Application Data

(60) Provisional application No. 63/545,708, filed on Oct. 25, 2023.

(51) Int. Cl.
*B07C 5/02* (2006.01)
*B07C 5/342* (2006.01)
*B07C 5/36* (2006.01)

(52) U.S. Cl.
CPC ................ *B07C 5/02* (2013.01); *B07C 5/342* (2013.01); *B07C 5/36* (2013.01); *B07C 2501/0054* (2013.01); *B07C 2501/0063* (2013.01)

(58) Field of Classification Search
CPC ......... B07C 5/02; B07C 5/342; B07C 5/3422; B07C 2501/0054; B07C 2501/0063
USPC .......................................................... 209/577
See application file for complete search history.

(56) References Cited

U.S. PATENT DOCUMENTS

| | | | |
|---|---|---|---|
| 3,732,034 | A | 5/1973 | Reid et al. |
| 3,848,813 | A | 11/1974 | Stanczyk et al. |
| 3,934,394 | A | 1/1976 | Garrison |
| 4,065,282 | A | 12/1977 | Morey |

(Continued)

FOREIGN PATENT DOCUMENTS

| | | |
|---|---|---|
| BE | 1028913 A1 | 7/2022 |
| CA | 3035602 | 3/2018 |

(Continued)

OTHER PUBLICATIONS

Kondo; Hironori, "Waste Material Processing System" (English Translation), Sep. 15, 2022, worldwide.espacenet.com (Year: 2022).*

(Continued)

*Primary Examiner* — Molly K Devine
(74) *Attorney, Agent, or Firm* — Greenberg Traurig LLP

(57) ABSTRACT

A system and method for materials recovery using a mobile materials recovery facility (MMRF) are provided. The presently disclosed subject matter aims to replace manual sorting lines and techniques with a mobile, robotized sorting line to automate the separation by using, for example, cameras, artificial intelligence assisted hyperspectral material recognition algorithms, and/or other sensor technologies (such as optical, RADAR, SONAR, and/or LIDAR), for treatment and removal of contaminations in the recycling, organics and residues streams.

9 Claims, 2 Drawing Sheets

(56) References Cited

U.S. PATENT DOCUMENTS 4,191,511 A 3/1980 Stewart et al.
4,227,849 A * 10/1980 Worthington ............. B65F 3/22 414/547
4,236,222 A 11/1980 Loshbough et al.
4,362,097 A 12/1982 Rogers
4,454,028 A 6/1984 Vetter et al.
4,460,131 A 7/1984 Cerroni
4,612,078 A 9/1986 Karp
4,730,790 A 3/1988 Williams
4,742,880 A 5/1988 Schrag et al.
4,874,134 A 10/1989 Wiens
5,071,075 A 12/1991 Wiens
5,101,977 A 4/1992 Roman
5,148,758 A 9/1992 Saly et al.
5,150,307 A 9/1992 McCourt et al.
5,184,780 A 2/1993 Wiens
5,213,593 A 5/1993 White, Jr.
5,250,100 A 10/1993 Armbristor
5,333,738 A 8/1994 Fuchs et al.
5,411,147 A 5/1995 Bond
5,551,218 A 9/1996 Henderson et al.
5,565,846 A 10/1996 Geiszler et al.
5,610,516 A 3/1997 Maier
5,649,785 A 7/1997 Djerf et al.
6,021,712 A 2/2000 Harrop
6,123,017 A 9/2000 Litle et al.
6,136,590 A 10/2000 Kruse
6,138,557 A 10/2000 Brown et al.
6,139,280 A 10/2000 Holt et al.
6,199,702 B1 * 3/2001 Buer ....................... B03B 9/061 209/930
6,217,288 B1 4/2001 Mirsky et al.
6,230,780 B1 5/2001 Rietheimer
6,250,472 B1 6/2001 Grubbs et al.
6,264,038 B1 7/2001 Schmidt
6,378,276 B1 4/2002 Dorge et al.
6,474,228 B1 11/2002 Leupe et al.
6,527,206 B1 3/2003 Wuebbels et al.
6,578,783 B2 6/2003 Simon et al.
6,593,853 B1 7/2003 Barrett et al.
6,633,798 B2 10/2003 Daniel et al.
6,787,713 B2 9/2004 Kuechenmeister et al.
6,974,097 B2 12/2005 Simon et al.
7,146,294 B1 12/2006 Waitkus, Jr.
7,293,415 B2 11/2007 Hoffmann et al.
7,389,880 B2 6/2008 Goldmann et al.
7,406,402 B1 7/2008 Waitkus, Jr.
7,503,513 B2 3/2009 Simon et al.
7,584,856 B2 9/2009 Miller et al.
7,674,055 B2 3/2010 Hiroike et al.
7,685,192 B1 3/2010 Scofield et al.
7,728,730 B2 6/2010 Langlois et al.
7,743,699 B1 6/2010 Freeman et al.
7,810,646 B2 10/2010 Miller et al.
7,892,500 B2 2/2011 Carner
7,897,884 B2 3/2011 Harish
7,957,937 B2 6/2011 Waitkus, Jr.
7,983,929 B2 7/2011 Zimmerman
8,006,734 B2 8/2011 Hajny et al.
8,046,192 B2 10/2011 McClain
8,146,841 B2 4/2012 Andela
8,162,213 B2 4/2012 Larson et al.
8,165,890 B2 4/2012 Roberts
8,165,891 B2 4/2012 Roberts
8,211,211 B1 7/2012 Knaebel
8,275,630 B2 9/2012 Dunning
8,285,681 B2 10/2012 Prahlad et al.
8,311,975 B1 11/2012 Gonsalves
8,322,639 B2 12/2012 Gitschel
8,362,903 B2 1/2013 Lindh et al.
8,371,214 B1 2/2013 Correale et al.
8,392,135 B2 3/2013 McClain et al.
8,393,558 B2 3/2013 Gitschel
8,398,006 B2 3/2013 Gitschel
8,459,466 B2 6/2013 Duffy et al.
8,579,997 B2 11/2013 Bai
8,684,288 B2 4/2014 Gitschel
8,812,971 B2 8/2014 Benedek et al.
8,813,972 B1 8/2014 Centers
8,882,955 B2 11/2014 Brandon et al.
9,061,289 B2 6/2015 Gitschel
9,545,650 B2 1/2017 Wang et al.
9,649,666 B2 5/2017 Gitschel
9,713,812 B1 7/2017 Gitschel
9,884,324 B2 2/2018 Gitschel
9,913,429 B1 3/2018 Stubbs et al.
9,945,608 B2 4/2018 Ploeger et al.
10,021,859 B1 7/2018 Miller
10,311,394 B2 6/2019 Miller et al.
10,377,518 B2 8/2019 Waite et al.
10,438,281 B2 10/2019 Walsh et al.
10,464,105 B2 11/2019 Koistinen et al.
10,535,022 B1 1/2020 Hood et al.
10,564,029 B2 2/2020 Waite et al.
10,661,984 B2 5/2020 Chan et al.
10,678,272 B2 6/2020 Lattanzio et al.
10,793,377 B2 10/2020 Martin et al.
10,799,915 B2 10/2020 Horowitz et al.
10,835,927 B2 11/2020 Torriere
10,853,353 B2 12/2020 Balaraman et al.
10,864,555 B2 12/2020 McCoy, Jr. et al.
10,984,394 B2 4/2021 Collins et al.
11,059,075 B2 7/2021 McCoy, Jr. et al.
11,069,053 B2 7/2021 Horowitz et al.
11,117,169 B2 9/2021 Torriere
11,123,939 B2 9/2021 Chan et al.
11,148,383 B2 10/2021 Waite et al.
11,162,834 B2 11/2021 Waite et al.
11,241,854 B2 2/2022 Waite et al.
11,327,957 B2 5/2022 Su et al.
11,481,257 B2 10/2022 Sharma et al.
11,508,021 B2 11/2022 Hovhannisyan et al.
11,571,869 B2 2/2023 Chan et al.
11,651,334 B1 5/2023 Megyese et al.
11,673,703 B1 6/2023 Gaydos et al.
11,693,705 B2 7/2023 Sharma et al.
11,707,747 B1 7/2023 Torriere
11,717,857 B2 8/2023 Torriere
11,734,074 B2 8/2023 Sharma et al.
11,776,670 B1 10/2023 Walk et al.
11,780,190 B2 10/2023 Chan et al.
11,850,761 B2 12/2023 Peterson et al.
11,850,818 B2 12/2023 Chan et al.
11,875,296 B2 1/2024 Benjamin et al.
12,044,470 B2 7/2024 Christensen et al.
12,070,921 B1 8/2024 Drier et al.
12,077,257 B2 9/2024 Maydanik
12,103,045 B2 10/2024 Kumar et al.
12,138,883 B2 11/2024 Chan et al.
12,139,293 B1 11/2024 Gaydos et al.
12,269,233 B2 4/2025 Chan et al.
12,440,852 B1 10/2025 Torriere
12,485,536 B2 12/2025 Byars et al.
12,496,618 B2 12/2025 Filler et al.
12,505,530 B2 12/2025 Lamb et al.
2002/0020175 A1 2/2002 Street et al.
2002/0108507 A1 8/2002 May et al.
2003/0028289 A1 2/2003 Daniel et al.
2003/0053906 A1 3/2003 Itou et al.
2003/0183705 A1 10/2003 Christiani et al.
2005/0015287 A1 1/2005 Beaver
2005/0065640 A1 3/2005 Mallett et al.
2005/0126958 A1 6/2005 Bohlig et al.
2005/0183990 A1 8/2005 Corbett, Jr.
2005/0197175 A1 9/2005 Anderson
2005/0209905 A2 9/2005 Ness et al.
2005/0242006 A1 11/2005 Bohlig et al.
2005/0280537 A1 12/2005 Feltz et al.
2006/0080819 A1 4/2006 McAllister
2006/0254957 A1 11/2006 Bohlig et al.
2007/0102109 A1 5/2007 Katritzky et al.
2007/0209530 A1 9/2007 Viaud
2008/0041982 A1 2/2008 Paulson et al.
2008/0141714 A1 6/2008 Cartwright et al.

(56) References Cited

U.S. PATENT DOCUMENTS

2008/0197058 A1 8/2008 Kenny
2008/0197194 A1 8/2008 Flood
2009/0008298 A1 1/2009 Studley
2009/0281677 A1 11/2009 Botich et al.
2010/0011717 A1 1/2010 Rivard
2010/0116881 A1 5/2010 Flood et al.
2010/0145629 A1 6/2010 Botich et al.
2010/0228601 A1 9/2010 Vaswani et al.
2010/0235209 A1 9/2010 Vaswani et al.
2010/0299097 A1 11/2010 Threlkeld et al.
2011/0071867 A1 3/2011 Chen et al.
2012/0004938 A1 1/2012 Beaver
2012/0029980 A1 2/2012 Paz
2012/0048129 A1 3/2012 Smith et al.
2012/0168354 A1 7/2012 Sundholm
2012/0199519 A1 8/2012 Ward
2012/0204740 A1 8/2012 Bergmann
2012/0217328 A1 8/2012 Bohlig et al.
2012/0266763 A1 10/2012 Foster et al.
2013/0008324 A1 1/2013 Verhaeghe et al.
2013/0132233 A1 5/2013 Rothley et al.
2013/0290511 A1 10/2013 Tu et al.
2014/0012553 A1 1/2014 Kelly et al.
2014/0156541 A1 6/2014 Waite et al.
2014/0157999 A1 6/2014 Verhaeghe et al.
2014/0214220 A1 7/2014 Kamel et al.
2014/0222665 A1 8/2014 Kamel et al.
2014/0236680 A1 8/2014 Chen et al.
2014/0303935 A1 10/2014 Kamel et al.
2014/0337107 A1 11/2014 Foster
2015/0199846 A1 7/2015 Sanderson et al.
2015/0204591 A1 7/2015 Burg et al.
2015/0283551 A1 10/2015 Gitschel
2015/0379785 A1 12/2015 Brown, Jr. et al.
2016/0014965 A1 1/2016 Naeyaert et al.
2016/0023417 A1 1/2016 Hanson et al.
2016/0081276 A1 3/2016 Riesterer et al.
2016/0088798 A1 3/2016 Lang et al.
2016/0166980 A1 6/2016 Pan et al.
2016/0187185 A1 6/2016 Smith
2016/0203146 A1 7/2016 Moll et al.
2016/0339445 A1 11/2016 Robinson
2017/0008671 A1 1/2017 Whitman et al.
2017/0011362 A1 1/2017 Whitman et al.
2017/0014868 A1 1/2017 Garcia, Jr. et al.
2017/0178066 A1 6/2017 High et al.
2017/0200135 A1 7/2017 Whitman et al.
2017/0202150 A1 7/2017 Smith
2017/0211969 A1 7/2017 Waite et al.
2017/0225199 A1 8/2017 Koistinen et al.
2017/0226439 A1 8/2017 Nguyen et al.
2017/0283292 A1 10/2017 Kim
2018/0037830 A1 2/2018 Bohlig et al.
2018/0056617 A1 3/2018 Chan et al.
2018/0056618 A1 3/2018 Chan et al.
2018/0057259 A1 3/2018 Chan et al.
2018/0112142 A1 4/2018 Foody et al.
2018/0229273 A1 8/2018 Carvajo Lucena et al.
2018/0268379 A1 9/2018 Collins et al.
2018/0364093 A1 12/2018 Vasconcelos et al.
2019/0030571 A1 1/2019 Horowitz et al.
2019/0039772 A1 2/2019 Le
2019/0039837 A1 2/2019 Zhou et al.
2019/0084012 A1 3/2019 McCoy, Jr. et al.
2019/0130560 A1 5/2019 Horowitz et al.
2019/0148797 A1 5/2019 Paszti
2019/0217342 A1 7/2019 Parr et al.
2019/0224617 A1 7/2019 Mitariten
2019/0224935 A1 7/2019 Waite et al.
2019/0249666 A1 8/2019 Lindberg et al.
2019/0293478 A1 9/2019 Waite et al.
2019/0304236 A1 10/2019 Chan et al.
2020/0010271 A1 1/2020 Bourn et al.
2020/0031513 A1 1/2020 Beach
2020/0048015 A1 2/2020 Martin et al.
2020/0087118 A1 3/2020 Sato et al.
2020/0129989 A1 4/2020 Schultz
2020/0164608 A1 5/2020 Waite et al.
2020/0171547 A1 6/2020 Torriere
2020/0197981 A1 6/2020 Neige et al.
2020/0222949 A1 7/2020 Murad et al.
2020/0338753 A1 10/2020 Schultz et al.
2020/0338758 A1 10/2020 Schultz et al.
2021/0012254 A1 1/2021 Campbell et al.
2021/0046513 A1 2/2021 McCoy, Jr. et al.
2021/0060618 A1 3/2021 Torriere
2021/0086999 A1 3/2021 Martin et al.
2021/0094075 A1 4/2021 Horowitz et al.
2021/0094894 A1 4/2021 Whitmore
2021/0170707 A1 6/2021 Chan et al.
2021/0179366 A1 6/2021 McCoy, Jr. et al.
2021/0206586 A1 7/2021 Douglas et al.
2021/0206588 A1 7/2021 Douglas et al.
2021/0217156 A1 7/2021 Balachandran et al.
2021/0290177 A1 9/2021 Novak, Jr. et al.
2021/0296008 A1 9/2021 Novak, Jr. et al.
2021/0327187 A1 10/2021 Wisniewski
2021/0328801 A1 10/2021 Sly et al.
2021/0335074 A1 10/2021 Cowles et al.
2021/0335458 A1 10/2021 McMullen
2021/0338102 A1 11/2021 Palacios et al.
2021/0375084 A1 12/2021 Aubrey et al.
2021/0402439 A1 12/2021 Torriere
2022/0027810 A1 1/2022 Murthy et al.
2022/0055071 A1 2/2022 Sharma et al.
2022/0108252 A1 4/2022 Narasimhan et al.
2022/0168898 A1 6/2022 Satat
2022/0180501 A1 6/2022 Perez
2022/0184855 A1 6/2022 Mleczko et al.
2022/0214273 A1 7/2022 Vandeputte et al.
2022/0230251 A1 7/2022 Kawamori et al.
2022/0274895 A1 9/2022 Mcconell
2022/0327538 A1 10/2022 Kumar et al.
2022/0343433 A1 10/2022 Yan et al.
2023/0061787 A1 3/2023 Feickert et al.
2023/0061958 A1 3/2023 Al Hosani et al.
2023/0120932 A1* 4/2023 Parr .......................... B07B 1/14
2023/0144877 A1 5/2023 Soundarrajan et al.
2023/0173543 A1 6/2023 Kumar et al.
2023/0286239 A1 9/2023 Chan et al.
2023/0305565 A1 9/2023 Morris
2023/0312273 A1* 10/2023 Teichrob .............. B65D 88/546
414/490
2023/0381824 A1 11/2023 Dadlani
2023/0394495 A1 12/2023 Abdelsamic
2024/0034019 A1 2/2024 Chan et al.
2024/0037471 A1 2/2024 Jones et al.
2024/0059858 A1 2/2024 Huber et al.
2024/0075702 A1 3/2024 Chan et al.
2024/0085102 A1 3/2024 Christensen et al.
2024/0100567 A1 3/2024 Mckiver
2024/0183609 A1 6/2024 Christensen et al.
2024/0198390 A1 6/2024 Parr et al.
2024/0281713 A1 8/2024 Gupta et al.
2024/0338655 A1 10/2024 Vandeputte
2024/0417891 A1 12/2024 Yip et al.
2025/0018401 A1 1/2025 Torriere et al.
2025/0108408 A1 4/2025 Potter et al.
2025/0166353 A1 5/2025 Luce et al.
2026/0048529 A1 2/2026 Chevrette et al.

FOREIGN PATENT DOCUMENTS

CN 204494897 U 7/2015
CN 206796893 12/2017
CN 107697380 2/2018
CN 108643104 10/2018
CN 109178728 1/2019
CN 110717368 A 1/2020
CN 112502953 3/2021
CN 115111673 A 9/2022
CN 113998335 B 3/2023
CN 116967155 A 10/2023
DE 10006740 A1 8/2001

(56) References Cited

FOREIGN PATENT DOCUMENTS

| | | | | |
|---|---|---|---|---|
| EP | 0557816 | A2 | 9/1993 | |
| EP | 4272136 | | 11/2023 | |
| GB | 2488996 | | 9/2012 | |
| JP | 3145885 | U | 10/2008 | |
| KR | 102865415 | B1 | 9/2025 | |
| WO | 1999/037474 | | 7/1999 | |
| WO | 03/031167 | | 4/2003 | |
| WO | 2004/012866 | | 2/2004 | |
| WO | 2018/044496 | A1 | 3/2018 | |
| WO | 2018/057126 | | 3/2018 | |
| WO | 2018/044498 | | 8/2018 | |
| WO | 2019/195257 | | 10/2019 | |
| WO | 2021/207240 | | 10/2021 | |
| WO | 2022/146427 | | 7/2022 | |
| WO | WO-2022190230 | A1 * | 9/2022 | ............ B07C 5/342 |
| WO | 2023/001935 | A1 | 1/2023 | |
| WO | 2024/009118 | A1 | 1/2024 | |
| WO | 2024/054552 | | 3/2024 | |
| WO | 2026/039767 | A1 | 2/2026 | |

OTHER PUBLICATIONS

Zhao; Yan, "Automatic Garbage Classification Equipment and Use Method Thereof" (English Translation), Feb. 1, 2022, worldwide. espacenet.com (Year: 2022).*

Konstantinidis, Fotiios K. et al.; Multi-sensor cyber-physical sorting system (CPSS) based on Industry 4.0 principles: A multi-functional approach; Elsevier B.V.; 2022.

USCF, Daily Health Screening, Nov. 19, 2021; 3 pages.

VMWARE, Employee Experience When They Receive a Health Attestation Notification in Workspace ONE Intelligent Hub App, Sep. 1, 2021.

Waste Management, Inc et al.; Waste Management—Customer Communications; Te Ohio State University; 1 page; Apr. 14, 2019; U.S.

Waste Management: Customer Communication; Autumn 2018, Engineering 5901.01 Multidisciplinary Design Capstone; 265 pages; Dec. 7, 2018; U.S.

Wissenschaftszentrum Nordrhein-Westfalen; Analysis and Evaluation of the Possible Uses of Biomass; Aug. 1, 2005; http://www.biogaseinspeisung.de/download/Endberichet-Band3_FhG-IUSE.pdf; 236 pages; Germany.

Young, Ben et al.; A System for Standardizing and Combining U.S. Environmental Protection Agency Emissions and Waste Inventory Data; Applied Sciences; Mar. 28, 2022; 16 pages.

Access Protocols for All State Offices and Facilities; Nov. 18, 2020; https://dbm.maryland.gov/employees/documents/covid-19%20building%20entry%20protocol.pdf; 2 pages.

Canadian Intellectual Property Office; Examiner Report, issued in connection to application No. 3,035,602; Sep. 29, 2023; 4 pages; Canada.

Canadian Intellectual Property Office; Office Action, issued in connection to application No. 3,063,184; Mar. 28, 2025; 4 pages; Canada.

Canadian Intellectual Property Office; Office Action, issued in connection to application No. 3035600, Mar. 13, 2024; 3 pages; Canada.

Canadian Intellectual Property Office; Office Action, issued in connection to application No. 3035601; Feb. 29, 2024; 3 pages; Canada.

Canadian Intellectual Property Office; Office Action, issued in connection to application No. 3095894; Jul. 31, 2025; 8 pages; Canada.

Canadian Intellectual Property Office; Office Action, issued in connection to patent application No. 3035600; Mar. 13, 2024; 3 pages; Canada.

Couling, Tom; Recovering Recyclables Through Mixed Waste Processing; Public Works 124.n2:p53; Hanley-Wood, Inc.; Feb. 1993; 3 pages.

Crowdblink, Employee Health Screening App: Daily Covid-19 Assessments, Nov. 19, 2021.

EcoHedge; Carbon Accounting Software: Streamline Your Sustainability Efforts; EcoHedge Ltd.; Jan. 8, 2024; 20 pages.

European Patent Office; PCT International Search Report, issued in connection to application No. PCT/ US2023/032164; 7 pages; Apr. 9, 2024; Europe.

European Patent Office; PCT International Search Report, Issued in connection to PCT/US2025/042232; Dec. 16, 2025; 5 pages; Europe.

European Patent Office; PCT Written Opinion of the International Searching Authority, issued in connection to application No. PCT/US2023/032164; 13 pages; Apr. 9, 2024; Europe.

European Patent Office; PCT Written Opinion of the International Searching Authority, Issued in connection to PCT/US2025/042232; Dec. 16, 2025; 9 pages; Europe.

Goevo, Return to work safely and quickly with the Personal Protective App (PPA), Dec. 31, 2021.

Graniefuel Engineering; Alliance Dairies' RNG Plant; 2023; 4 pages.

Higley, Card Access Data Integration and Reporting During COVID-19, Aug. 31, 2020.

Humpston, Giles et al.; Identification of Fibre Composition of Apparel for Recycling; Dec. 31, 2015; 15 pages.

International Search Report and Written Opinion, issued in connection to application No. PCT/US2017/045315, Oct. 30, 2017.

Kareem, Shefy Manayil; Introducing new ESG data and reporting capabilities in Microsoft Cloud for Sustainability; Jun. 15, 2023; 11 pages.

Kat, Jeff; Research Targets Sorting Robots and Separating Chemicals to Improve Plastic Recycling; https://www.forbes.com/sites/jeffkart/2021/01/15/research-targets-sorting-robots-and-separating-chemicals-to-improve-plastic-recycling/?sh=46705ab53fd1; Jan. 15, 2021; 4 pages.

Lawton, George; 18 Sustainability Management Software Providers to Consider; Apr. 11, 2023; 10 pages.

Mathai, George et al.; HartEnergy: Controlling Reciprocating Compressors; Jul. 1, 2008; 10 pages.

Mexican Institute of Industrial Property; Office Action, issued in connection to application No. MX/a/2019/002485; 4 pages; Aug. 25, 2023; Mexico.

Mexican Institute of Industrial Property; Office Action, issued in connection to application No. MX/a/2019/002485; 4 pages; Nov. 27, 2019; Mexico.

Mexican Institute of Industrial Property; Office Action, issued in connection to application No. MX/a/2019/002485; 5 pages; Apr. 30, 2019; Mexico.

Mexican Institute of Industrial Property; Office Action, issued in connection to application No. MX/a/2019/002485; 5 pages; Feb. 16, 2024; Mexico.

Microsoft, Use the Employee Return to the Workplace app, Aug. 3, 2021.

Perennial Energy; Biogas Processing Systems; 2015; 2 pages.

Perez, Maria Marin; Analysis of European post-consumer textile waste for automated sorting; Dec. 31, 2021; 40 pages.

Public Works; Refuse Processing and Resource Recovery; Public Works 125 n5: pE22; Hanley-Wood, Inc.; Apr. 15, 1994; 18 pages.

Returnsafe, Health Screening Prior to Entering the Workplace, Nov. 19, 2021.

Riba, Jordi-Roger et al.; Post-Consumer Textile Waste Classification through Near-Infrared Spectroscopy, Using an Advanced Deep Learning Approach; Polymers; Jun. 17, 2022; 14 pages.

Ryerson, Introducing RyersonSafe for health screening process for all students, faculty, staff, visitor, Jul. 12, 2021.

Schneider, Robert J. et al.; Multilevel MRF Solves Solid Waste Challenges; BioCycle 34.5: 62.J.G.; Press Inc.; May 1993; 4 pages.

Servicenow, Configure Employee Health Screening, Dec. 31, 2021.

Spyridis, Yannis et al., Autonomous AI-enabled Industrial Sorting Pipeline for Advanced Textile Recycling; Apr. 29, 2024; 7 pages.

Spyridis, Yannis et al.; Textile Analysis for Recycling Automation using Transfer Learning and Zero-Shot Foundation Models; Jun. 6, 2025; 7 pages.

(56) References Cited

OTHER PUBLICATIONS

The International Bureau of WIPO; PCT International Preliminary Report on Patentability, issued in connection to application No. PCT/US2017/045294; Mar. 5, 2019; 7 pages; Switzerland.
The International Bureau of WIPO; PCT International Preliminary Report on Patentability, issued in connection to application No. PCT/US2023/032164; Mar. 20, 2025; 13 pages; Switzerland.
The International Bureau of WIPO; PCT International Preliminary Report on Patentability, issued in connection to application PCT/US2017/045278; Mar. 5, 2019; 9 pages; Switzerland.
Toto, Deanne; AMP Robotics Introduces Material Characterization Software; https://www.wastetodaymagazine.com/article/amp-material-characterization-software-mf-operations/; Apr. 27, 2021; 11 pages.
U.S. Patent and Trademark Office; PCT International Search Report, issued in connection to application No. PCT/US2017/045294; Oct. 10, 2017; 2 pages; US.
U.S. Patent and Trademark Office; PCT Written Opinion of the International Searching Authority, issued in connection to application No. PCT/US2017/045294; Oct. 10, 2017; 6 pages; US.
Ullal, Mithun S., et al.; AI-enabled robotic sorting for circular textile waste management: A scalable solution for India's recycling sector; Nov. 1, 2025; pp. 876-882.
United States Patent and Trademark Office; PCT International Search Report, issued in connection to application PCT/US2017/045278; Nov. 2, 2017; 3 pages; US.
United States Patent and Trademark Office; PCT International Search Report, issued in connection with application No. PCT/US2019/025345; Jul. 22, 2019; 4 pages; US.
United States Patent and Trademark Office; PCT Written Opinion of the International Searching Authority, issued in connection to application PCT/US2017/045278; Nov. 2, 2017; 8 pages; US.
United States Patent and Trademark Office; PCT Written Opinion of the International Searching Authority, issued in connection with application No. PCT/US2019/025345; Jul. 22, 2019; 7 pages; US.

* cited by examiner

SYSTEM AND METHOD FOR MATERIALS RECOVERY USING A MOBILE MATERIALS RECOVERY FACILITY (MMRF)

RELATED APPLICATION

This application claims the benefit, and priority benefit, of U.S. Provisional Patent Application Ser. No. 63/545,708, filed Oct. 25, 2023, the disclosure and content of which is incorporated by reference herein in its entirety.

BACKGROUND

Field of the Invention

The presently disclosed subject matter relates generally to materials recovery, and more particularly, to a system and method for mobile materials recovery.

Description of the Related Art

Public event organizers and service providers in areas where multi-family apartment complexes are located or dense urban areas where recycling collections are performed at a centralized point are currently seeking services and tools to reduce the carbon footprint of their collections and events and to increase landfill diversion due to their sustainability goals or initiatives. This trend is driven by the global environmental awareness of the population.

Waste management and recycling at these large private and public areas and at events in these areas is a major topic of concern. Many event organizers already have in place three-way collection bins on site (recycling, organics and residues) that are often misused by the public, e.g., tossing materials into the incorrect bin. Event organizers are then faced with materials that are difficult, if not impossible, to recycle, given the contamination of each of the three flow streams. No sorting center is equipped to effectively receive and process this excessively contaminated material.

To purify the three steams (that is, to generate only recyclables in the recyclable stream, only organics in the organics stream and only residues in the residues stream), some event organizers have set up on-site sorting lines, but these are manual and labor-intensive (problematic in these times of labor scarcity) and also not very efficient with very low recovery rates. Event organizers are also challenged with high volume generation levels during events, which makes it difficult or impossible to go thru 100% of materials unless the working team stays for a few days post-event.

Improvements in this field of technology are therefore desired.

SUMMARY

Various illustrative embodiments of a system for materials recovery using a mobile materials recovery facility (MMRF) are provided herein.

In certain illustrative embodiments, a mobile sorting system for gathering and sorting recyclable materials can include a first mobile unit and a second mobile unit. The first mobile unit can include a first trailer and a material gathering unit at least partially disposed within the first trailer. The material gathering unit can include a pourer (such as a cart or bin tipper) configured to grasp a waste or recycling receptacle (such as a tote or small dumpster) and pour bags containing recyclable materials from the waste or recycling receptacle, a bag opener, a vibrating (or vibratory) feeder, and a conveyor (such as a conveyer belt) configured to transport the recyclable material from the first mobile unit to the second mobile unit. The second mobile unit can include a second trailer and a material sorting unit at least partially disposed within the second trailer. The material sorting unit can include a scanner (such as an artificial intelligence or "A.I." scanner) configured to scan and identify material in the recyclable materials as it travels on a sorting conveyer and at least one robotic arm configured to grab material from the recycled materials based on identity and deposit the material into a designated sorting bin.

In certain aspects, the scanner can utilize computer software and is configured to sort the material based on one or more of commodity value, material efficiency, and physical characteristics comprising one or more of shape and weight. The scanner can utilize computer software and can be configured to adapt dynamically and sort the material based on the most economically valuable materials. The scanner can utilize computer software and can be configured to adapt dynamically and sort the material based on the materials that are easiest to process. The scanner can utilize computer software and can be configured to adapt dynamically and sort the material based on the materials that are quickest to process. The sorting bin can have at least one load cell disposed therein to measure the amount of material that has been processed in the sorting bin. The scanner can be configured to identify recyclable material, organic material and residual material, and to adjust sorting parameters for the system based on which material is being processed. The vibrating feeder can be configured to distribute the recyclable material over the entire width of the conveyor with no overlapping, and the scanner can be configured to identify the type of material in the recyclable material and to calculate its exact position on the conveyor and instruct the robotic arm to pick the identified material.

Various illustrative embodiments of a method for materials recovery using a mobile materials recovery facility (MMRF) are also provided herein.

In certain illustrative embodiments, a method for gathering and sorting recyclable materials can include: grasping a waste or recycling receptacle with a mechanical arm and depositing the contents of the waste or recycling receptacle into a bag opener located in a first trailer, wherein the contents of the waste or recycling receptacle comprise at least one of bagged and unbagged recyclable materials; opening any bags from the contents of the waste or recycling receptacle to release the bagged recyclable materials; depositing the recyclable material from the bag opener into a vibrating feeder; vibrating the recyclable material in the vibrating feeder; transferring the recyclable materials into a second trailer; scanning the recyclable materials using an optical scanner in or near the second trailer and identifying one or more components in the recyclable materials; grasping the identified one or more components with a robotic arm; and depositing the identified one or more components into a designated sorting bin.

Figure 1:
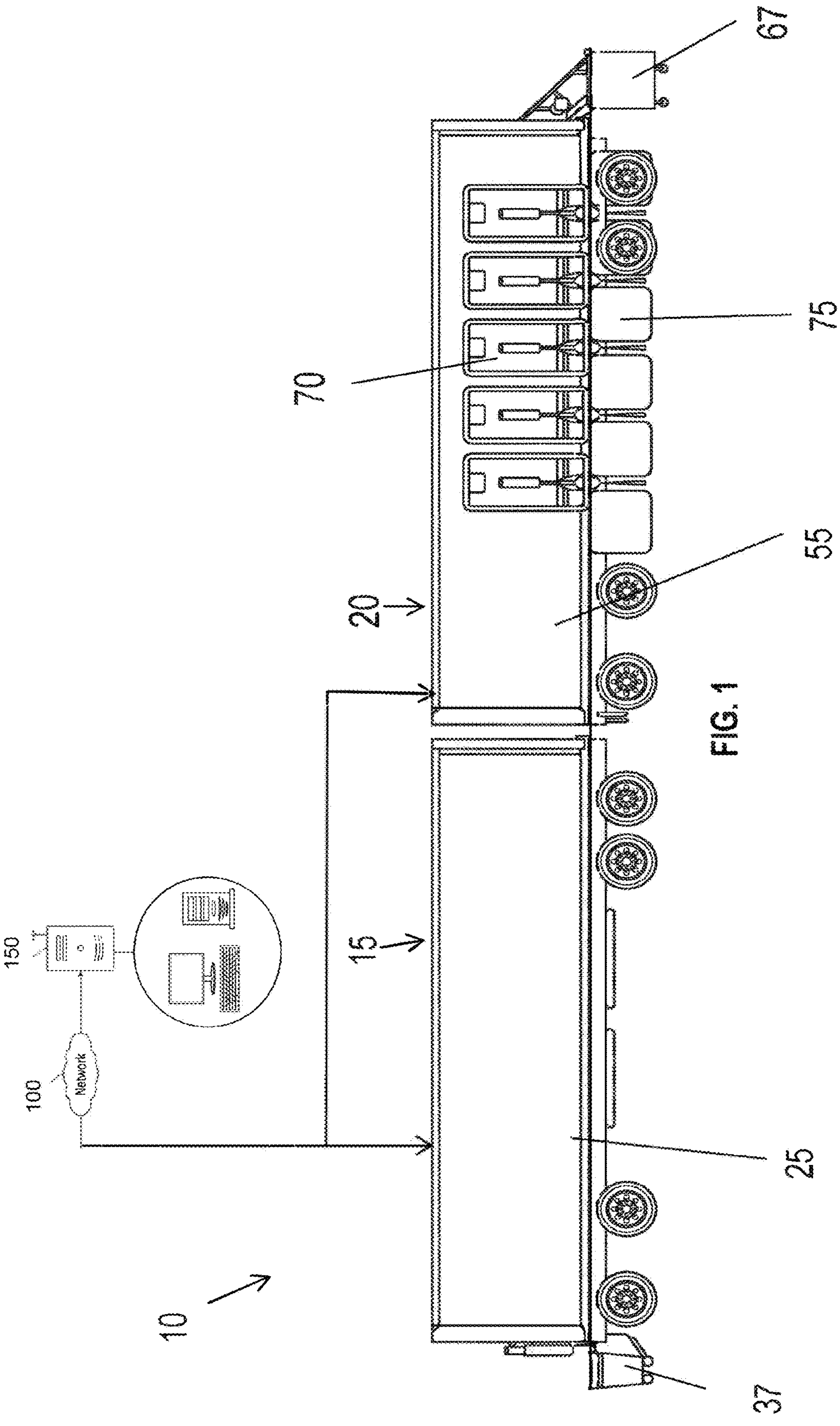
FIG. 1 is a side view of a system for materials recovery using a mobile materials recovery facility, in accordance with an illustrative embodiment of the presently disclosed subject matter.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

Various illustrative embodiments of a system and method for materials recovery using a mobile materials recovery facility (MMRF) are provided herein.

In certain illustrative embodiments, the presently disclosed subject matter aims to replace manual sorting lines and techniques at public events with a mobile, robotized sorting line to automate the separation by using, for example, cameras, artificial intelligence assisted hyperspectral material recognition algorithms, and/or other sensor technologies (such as optical, RADAR, SONAR, and/or LIDAR), for treatment and removal of contaminations in the recycling, organics and residues streams.

In certain illustrative embodiments, the presently disclosed subject matter allows on-site sorting of multiple inbound material types collected in the various recovery bins deployed at an event site (such as a outdoor sporting event or concert venue), thus avoiding double handling with a collection truck, transport to a sorting center and subsequently, transport of the recyclable materials to conditioners. In other words, with such a mobile system, the transport step to a sorting center is thus avoided and a user can move directly from sorting to selective collection on-site to the conditioners of the materials.

In certain illustrative embodiments, the presently disclosed subject matter provides event organizers with an on-site sorting system and service able to treat and remove contamination from each of the material flow streams, and in addition, carry out a specific sorting of recyclable materials into distinct by-products. The result is to have separated the materials from selective collection, and also to remove from the flow of organic materials and the flow of final residues, the recyclable materials which may have been mistakenly deposited in the wrong container. This can increase the capture rate of targeted materials and improve the quality of the materials sorted. Some additional benefits are increased efficiency of material recovery generated during public events, enabling materials to be sorted directly on site, and helping public event organizers to achieve zero waste goals.

Moreover, in certain illustrative embodiments, there are additional benefits of waste characterization and data collection at these large outdoor events due to camera based technology that is configured for image detection and object classification, in that the collected data could be useful for the event for reporting purposes and to change waste management for better sustainability.

Figure 2:
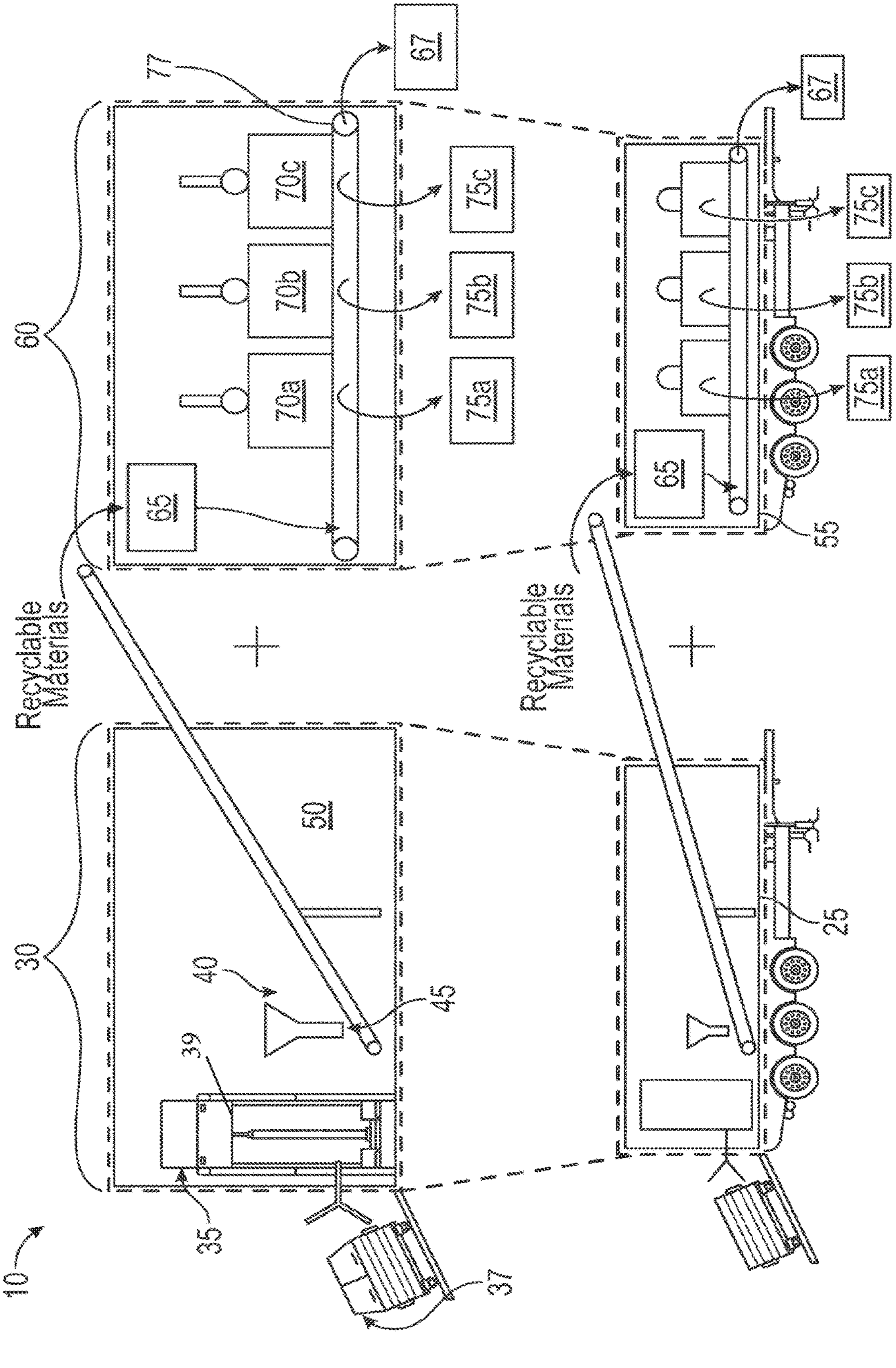
FIG. 2 is a side view and an exploded side view of a system for materials recovery using a mobile materials recovery facility, in accordance with an illustrative embodiment of the presently disclosed subject matter.

In certain illustrative embodiments, as shown in FIG. 1 (in a side view) and FIG. 2 (in side and exploded views), the mobile sorting system 10 for gathering and sorting recyclable materials can include a first mobile unit 15 and a second mobile unit 20. The first mobile unit 15 can include a first trailer 25 and a material gathering unit 30 at least partially disposed within the first trailer 25. The material gathering unit 30 can include a pourer or similar mechanical arm 35 (such as a cart or bin tipper) configured to grasp a waste or recycling receptacle 37 (such as a tote or small dumpster) and pour bags containing recyclable materials from the waste or recycling receptacle 37 into a bag opener 40 and a vibrating (or vibratory) feeder 45, and a conveyor 50 (such as a conveyer belt) configured to transport the recyclable material exiting the vibrating (or vibratory) feeder 45 from the first mobile unit 15 to the second mobile unit 20. The second mobile unit 20 can include a second trailer 55 and a material sorting unit 60 at least partially disposed within the second trailer 55. The material sorting unit 60 can include a scanner 65 (such as an artificial intelligence or "A.I." scanner using optical scanning technology) configured to scan and identify material in the recyclable materials received from the first trailer 25 as they travel on a sorting conveyer 77 and at least one robotic arm 70 configured to grab material from the recycled materials based on identity and deposit the material into a sorting bin 75. In certain illustrative embodiments, system 10 can be fed manually or using automatic pourer 35.

In certain illustrative embodiment, the first trailer 25 and the second trailer 55 of the mobile sorting system 10 can be two or more large containers (approximately 45 feet each), such as, for example, sea containers. The first trailer 25 can be a front-end trailer used for the front-end gathering process. The second trailer 55 can be a back-end trailer used for the artificial intelligence vision system and can utilize a plurality (e.g., 5 to 6) of sorting robotic arms 70*a*, 70*b*, 70*c*, etc., for sorting purposes.

In certain illustrative embodiments, the first trailer 25 can allow an operator to load recyclable material to the sorting line using a pourer 35 (such as a cart or bin tipper) that has the flexibility for different size bins 37 containing recyclable material (bagged and/or unbagged). Then, the material can pass through a bag opener 40 to be liberated (especially if in bags), and material can be discharged onto a vibrating feeder 45 while the emptied bags are discharged into a separate receptacle. The vibrating feeder 45 can distribute the liberated material over the entire width of a conveyor 50 and in individual pieces with no overlapping. This material distribution can allow scanner 65 and associated artificial intelligence detection system in the second trailer 55 to correctly identify the type of material and to calculate its exact position on the conveyor 77 to have the robotic arm 70 to correctly pick the desired item. The vibrating feeder 45 will effectively liberate materials after the bag opener 40 as well as disperse materials onto conveyer 50 more evenly and in a mono and homogeneous layer. This dispersion method will make it easier for the scanner 65 and the associated artificial intelligence detection system in the second trailer 55 to identify the objects, reduce risk of over lapping and then physically remove the item with the robot arms 70.

In certain illustrative embodiments, the first trailer 25 can utilize precise metering and feeding of materials to ensure even distribution onto the sorting conveyer 77. The vibratory feeder 45 can be used to spread materials evenly across the width of the conveyer 50, preventing issues like rolling or overlapping, which could interfere with the sorting process. In certain illustrative embodiments, a load cell 39 can be utilized on a hopper (such as on pourer 35) in the first trailer 25 to monitor the material input, ensuring that the system 10 operates within optimal parameters. This front-end design is crucial for maintaining the stability of materials on the conveyer 50, allowing for more accurate scanning and sorting downstream.

In certain illustrative embodiments, the scanner 65 and associated artificial intelligence detection system in the second trailer 55 can analyze the material using algorithms and hyperspectral imagery recognition to provide directives to each individual sorting robotic arm 70. The positive sorted material (that is, the material fraction that can be picked by the robot arms 70) can be put in dedicated bins 75*a*, 75*b*, 75*c* by those arms 70*a*, 70*b*, 70*c*, and the negative fraction of the material can continue on the conveyor 77 to the end of the line into a negative fraction bin 67.

In certain illustrative embodiments, the mobile sorting system 10 can utilize multiple robotic arms 70*a*, 70*b*, 70*c*, etc. . . . , designed to handle different types of materials more effectively. This can increase the efficiency of the sorting process by ensuring that each material type, whether it is a crumpled piece of plastic or a flat piece—is picked up by the most suitable robotic arm 70. The robotic arms 70*a*, 70*b*, 70*c*, etc. . . . can use a computer algorithm to decide which robotic arm 70 to deploy based on the material's shape and the desired outcome, such as minimizing contamination or maximizing recovery rates. This approach could also involve prioritizing the selection of materials based on their economic value.

In certain illustrative embodiments, the mobile sorting system 10 can utilize artificial intelligence and robotic technologies to efficiently sort recyclable, organic and residual materials. Each of the three (3) material streams can be processed separately and depending on which stream is being processing, adjustments can be made to system sorting parameters.

In certain illustrative embodiments, the recyclables stream can be processed through the automated line of system 10 to extract organic material and residue to reduce recycling stream contamination. Extracted organic material can be set aside for transport to an organics processing facility, while residue can be set aside for transport to a disposal facility. Cleaned up recyclables can be sent to one or more recycling facilities for further processing or sold directly to an end customer.

In certain illustrative embodiments, similar processes through the automated line of system 10 can be repeated for the organics stream. The system 10 can extract recyclables and residues from the stream. Extracted residues can be sent to a disposal facility, while extracted recyclables can be sent to a recycling facility for further processing. Cleaned up organics can be sent to an organics processing facility.

In certain illustrative embodiments, for the residue stream, the system 10 can extract recyclables and organic materials to increase landfill diversion. Extracted organics can be sent to an organics processing facility, while extracted recyclables can be sent to a recycling facility for further processing. After reducing the residue stream, the residue (post-sorting) can be sent to a disposal facility.

In certain illustrative embodiments, system 10 can be a mobile set up with self-sustained power (e.g., either via generator or on-site power with quick disconnect) for electrical needs and can be deployable in any public area with sufficient space, such as in the yards of any public events or underground parking. All mechanical components of system 10 can be hydraulically powered to facilitate in-field installation and reduce electricity consumption. In certain illustrative embodiments, only one hydraulic power pack can be needed to make the line run. In certain illustrative embodiments, system 10 can be contained in only two sea containers, thus allowing it to be transported and deployed even into very limited spaces.

In certain illustrative embodiments, the first trailer 25 and the second trailer 55 can be installed sequentially, one at the end of the other, and the system 10 can be installed after few manipulations. In certain illustrative embodiments, the system 10 can be run by two operators at the most. In certain illustrative embodiments, the first trailer 25 and the second trailer 55 can be also equipped with removable side panels that can be opened, so the public can see the robotic arms 70 in function, thus creating a new attraction and raising public awareness about the importance of recycling and eliminating contamination. The use of two trailers (such as the first trailer 25 for the front end process (infeed and metering) and the second trailer 55 for sorting and scanning) is a preferred embodiment, but a third, fourth or even additional trailers would bring additional sorting capabilities (for more commodities) and could also be utilized. Moreover, a single trailer with multiple compartments or functional sections could also be utilized without departing from the spirit and scope the presently disclosed subject matter.

In certain illustrative embodiments, the first trailer 25 can have both manual and automatic leveling systems. Proper leveling is beneficial not just for the first trailer 25 but also for the conveyer 50 and vibrating feeder 40, ensuring that all components remain flat and stable. An uneven conveyer 50 or trailer 25 could cause materials to shift, leading to sorting errors or equipment malfunction. In certain illustrative embodiments, the vibrating feeder 40 can walk off its position if not properly leveled, underlining the need for precise leveling mechanisms.

In certain illustrative embodiments, system 10 can be used to sort specific commodities, if needed. For example, aluminum cans are a valuable commodity that can be sorted by system 10. Moreover, given the extended producer responsibility (EPR) that is currently rolling out in many states/provinces, system 10 is not only suitable for public events, but also for a series of other applications such as high-density residential areas (multi-family), office towers, remote locations, shopping centers, airports, ports, etc. In certain illustrative embodiments, system 10 can also be used for material characterization audits, given that artificial intelligence technology can sort multiple grades for material.

In certain illustrative embodiments, final equipment specs for system 10 (e.g., conveyor width and speed, quantity of arms and sequence of sorting, etc) can be further defined upon testing and engineering. Additional testing can also be performed on the optical detection capabilities, validation of the robotic vision system and training of the hyperspectral and artificial intelligence model, the prehension device design and capacity of the arm robot, and validation of gripper protocol and adaptation to different materials.

In certain illustrative embodiments, system 10 can utilize one or more drip pans to manage any potential leakage, particularly liquids, to maintain cleanliness and prevent contamination of the materials being processed. System 10 can also utilize one or more load cells (not shown) in bins to monitor material distribution. The inclusion of load cells on the bins is designed to control material throughput more accurately, providing data on the amount of material being processed. Additionally, one or more chains or other mechanisms can be used to ensure that materials are evenly distributed across the sorting belt 77, minimizing overlap and maximizing the efficiency of the sorting process.

In certain illustrative embodiments, system 10 can utilize software that incorporates a decision tree that allows the sorting system to prioritize actions based on different criteria such as commodity value, material efficiency, or physical characteristics like shape and weight. This decision-making framework can enable the system 10 to adapt dynamically, either focusing on the most valuable materials (like aluminum) or optimizing throughput by choosing the materials that are easiest or quickest to process. The decision tree could also involve selecting materials that are larger or heavier first, allowing smaller items to be picked up more effectively later, thus reducing material waste and improving overall efficiency.

In certain illustrative embodiments, system 10 can be configured to generate detailed reports with specific materials tracking. For example, the reports can track specific brands of materials processed, such as distinguishing between Coca-Cola® and Pepsi® bottles. This capability would not only help meet diversion goals but could also offer brand owners detailed data on the recycling rates of their products. The system 10 could potentially track consumer behavior and waste patterns, thus providing valuable insights for companies interested in understanding how their products are being disposed of and recycled.

In certain illustrative embodiments, a method for gathering and sorting recyclable materials is provided. The method can include: grasping a waste or recycling receptacle 37 with a mechanical arm 35 such as a pourer and depositing the contents of the waste or recycling receptacle 37 into a bag opener 40 located in a first trailer 25, wherein the contents of the waste or recycling receptacle 37 comprise bagged and/or unbagged recyclable materials; opening any bags from the contents of the waste or recycling receptacle 37 to release the bagged recyclable materials; depositing the recyclable materials from the bag opener 40 into a vibrating feeder 45; vibrating the recyclable material in the vibrating feeder 45; transferring the recyclable materials into a second trailer 55; scanning the recyclable materials using an optical scanner 65 in or near the second trailer and identifying one or more components in the recyclable materials; grasping the identified one or more components with a robotic arm 70; and depositing the identified one or more components into a designated sorting bin 75. The scanning and identifying can be performed using optical scanning and artificial intelligence technologies.

In certain illustrative embodiments, a communications network 100 may be adapted for use in the system 10 of FIG. 1 and FIG. 2. For example, the system 10 can include a communications link between the various equipment components. The communications network 100 can include a plurality of data sources and a central server. Data sources may be, for example, devices configured for capturing and communicating operational data indicative of one or more operational characteristics of the system components and sharing information and operational instructions between the various components. Data sources are configured to communicate with a central server by sending and receiving operational data over a network (e.g., the Internet, an Intranet, or other suitable network).

In certain illustrative embodiments, the central server can be a local central server configured to process and evaluate the operational data received from data sources. Communications devices can be disposed on the system components. The communications devices and local central server are configured to communicate with each other via a communications network (e.g., the Internet, an Intranet, a cellular network, or other suitable network). In addition, communications device and central server are configured for storing data to an accessible central server database located on, or remotely from, the local central server.

In certain illustrative embodiments, the communication between the communications devices and the local and/or remote central server may be provided on a real time basis. Alternatively, communication devices may be configured to temporarily store or cache data and transfer the data to the desired central server.

In certain illustrative embodiments, system can also include one or more computer processors 150 which can be, for example, a standard desktop or laptop personal computer ("PC"), or a computing apparatus that is physically integrated with system 10. Computer 150 can also communicate with central server via a communications network.

In certain illustrative embodiments, central server can be configured to receive and store operational data from the various system components and evaluate the data to improve operational efficiency for system 10. Central server can include various means for performing one or more functions in accordance with embodiments of the present invention, including those more particularly shown and described herein; however, central server may include alternative devices for performing one or more like functions without departing from the spirit and scope of the present invention.

In certain illustrative embodiments, central server can include standard components such as processor and user interface for inputting and displaying data, such as a keyboard and mouse or a touch screen, associated with a standard laptop or desktop computer. Central server also includes a communication device for wireless communication with computer 150.

Central server may include software that communicates with one or more memory storage areas. Memory storage areas can be, for example, multiple data repositories which stores pre-recorded data. Database for data storage can be in memory storage area and/or supplementary external storage devices as are well known in the art.

While a "central server" is described herein, a person of ordinary skill in the art will recognize that embodiments of the present invention are not limited to a client-server architecture and that the server need not be centralized or limited to a single server, or similar network entity or mainframe computer system. Rather, the server and computing system described herein may refer to any combination of devices or entities adapted to perform the computing and networking functions, operations, and/or processes described herein without departing from the spirit and scope of embodiments of the present invention.

The presently disclosed subject matter has an number of advantages. For example, existing technologies have cross-contamination on customer-facing waste streams bins used during public events, which limits recycling environmental performances of the material as well as decreases the recovery of recycling and organic materials during those same events. By comparison, the presently disclosed subject matter can allow public event organizers to increase their environmental performances, to reduce carbon footprint of the activities, and to get toward zero waste events.

Moreover, recyclable streams can be cleaner, allowing a better recovery rate, and organics out of the system can also be cleaner and residues can be limited to what can't be recyclable or compostable. Having cleaner recyclable material in the recycling stream, and having cleaner organic material in the organic stream without contamination, can then reduce the residues fraction that is in those both streams. Based on other above potential applications, the presently disclosed subject matter could solve a multitude of existing problems related to space constraint, labor shortage, data collection needs, and landfill diversion targets among a few.

Existing technologies also have space, logistical and economical constraints to getting the material to a traditional MRF facility. By comparison, the presently disclosed subject matter provides space, logistical and economic improvements. For example, as to space, the presently disclosed subject matter can be a portable system that can be able to travel to sites on public roads, as well as provide an area for dedicated sorting at events that are often limited with space. As to logistics, in current conditions if there were any sort of separation occurring, that would be by a manual process, which involves complexity, potential error and safety concerns around deploying manual labor to sort through the stream. The presently disclosed subject matter alleviates these concerns. As to economics, the potential cost savings for automating and creating the presently disclosed mobile unit would give users a competitive advantage in bidding for these types of services.

In certain illustrative embodiments, the presently disclosed subject matter also provides an innovative way for recycling to take place at multi-family residences. Currently, recycling rates are low and contamination rates in general are high within the recycling stream from these sources. Education is the primary tool that is used to help battle the high contamination percentage. This technology due to its portability and innovative sorting capabilities can help manage the stream on-site, and produce a recyclable stream and residual stream that could go to a landfill.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the non-provisional claims.

What is claimed is:

1. A mobile sorting system for gathering and sorting recyclable materials, comprising:

a first mobile unit and a second mobile unit downstream from the first mobile unit, the first mobile unit comprising:

a first trailer; and a material gathering unit at least partially disposed within the first trailer, the material gathering unit comprising:

a pourer configured to:

grasp a waste or recycling receptacle external to the first trailer; and pour one or more of recyclable materials and bags into a hopper, the bags comprising recyclable materials from the waste or recycling receptacle;

the hopper configured to receive the bags having recyclable materials;

a bag opener configured to receive the bags from the hopper and open the received bags; and a load cell is disposed on the hopper and configured to monitor the material input when the one or more of recyclable materials and bags are loaded in the hopper, and a vibrating feeder configured to:

receive the recyclable materials from the bag opener;

vibrate and liberate the recyclable materials; and disperse the liberated recyclable materials onto a conveyor;

the conveyor configured to transport the recyclable materials from the vibrating feeder to the second mobile unit; and the second mobile unit comprising:

a second trailer; and a material sorting unit at least partially disposed within the second trailer, the material sorting unit comprising:

a scanner configured to:

receive the recyclable materials from the conveyor; and identify respective material attributes in the recyclable materials, and at least one robotic arm configured to grab material from the recycled materials based on an identified material attribute and deposit the material into a sorting bin.

2. The mobile sorting system of claim 1, wherein the material attribute includes one or more of commodity value, material efficiency, and physical characteristics comprising one or more of shape and weight.

3. The mobile sorting system of claim 1, wherein the scanner utilizes computer software and is configured to adapt dynamically and sort the material based on the most economically valuable materials.

4. The mobile sorting system of claim 1, wherein the scanner utilizes computer software and is configured to adapt dynamically and sort the material.

5. The mobile sorting system of claim 1, wherein the scanner utilizes computer software and is configured to adapt dynamically and sort the material based on the materials that are quickest to process.

6. The mobile sorting system of claim 1, wherein:

the load cell is a first load cell; and the sorting bin has a second load cell disposed therein to measure an amount of material that has been processed in the sorting bin.

7. The mobile sorting system of claim 1, wherein the scanner is configured to identify recyclable material, organic material and residual material, and to adjust sorting parameters for the system based on which material is being processed.

8. The mobile sorting system of claim 1, wherein:

the vibrating feeder is configured to distribute the recyclable material over a width of the conveyor with no overlapping of the recyclable materials with respect to each other;

the material attribute is a type of material; and the scanner is configured to to calculate an exact position of a particular material on the conveyor corresponding to a particular type of material and instruct the robotic arm to pick the particular material.

9. A method for gathering and sorting recyclable materials using a mobile unit having a first mobile unit and a second mobile unit, comprising:

grasping a waste or recycling receptacle having waste contents with a mechanical arm, wherein the mechanical arm is coupled to the first mobile unit, the first mobile unit comprises a first trailer and material gathering unit at least partially within the first trailer, and the waste or recycling receptacle is positioned outside the first and second mobile units;

depositing the waste contents of the waste or recycling receptacle into a hopper located in the first trailer;

monitoring the material input of the waste contents in the hopper with a load cell;

depositing the waste contents of the hopper into a bag opener located in the first trailer, wherein the waste contents of the waste or recycling receptacle comprise bagged recyclable materials and unbagged recyclable materials;

opening, via the bag opener, each respective bag housing the bagged recyclable materials;

depositing the recyclable material from the bag opener into a vibrating feeder;

vibrating the recyclable material in the vibrating feeder and liberating the recyclable material;

dispersing the liberated recyclable material from the vibrating feeder onto a conveyer and transferring the liberated recyclable materials into a second trailer on the conveyer;

scanning the recyclable materials using an optical scanner in the second trailer and identifying one or more components in the recyclable materials;

grasping the identified one or more components with a robotic arm; and depositing the identified one or more components into a designated sorting bin.

* * * * *